(12) United States Patent
Sakata (10) Patent No.: US 10,174,672 B2
(45) Date of Patent: Jan. 8, 2019

(54) ELECTRIC WASTE GATE VALVE CONTROL DEVICE

(71) Applicant: FUJI JUKOGYO KABUSHIKI KAISHA, Tokyo (JP)

(72) Inventor: Norihiko Sakata, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 143 days.

(21) Appl. No.: 15/440,491

(22) Filed: Feb. 23, 2017

(65) Prior Publication Data
US 2017/0276065 A1   Sep. 28, 2017

(30) Foreign Application Priority Data

Mar. 24, 2016 (JP) .................................. 2016-060015

(51) Int. Cl.
*F02B 37/18* (2006.01)
*F16K 31/02* (2006.01)
*F02D 41/00* (2006.01)

(52) U.S. Cl.
CPC ............ *F02B 37/186* (2013.01); *F02B 37/18* (2013.01); *F02B 37/183* (2013.01); *F02D 41/0007* (2013.01); *F16K 31/02* (2013.01)

(58) Field of Classification Search
CPC ....... F02B 37/18; F02B 37/183; F02B 37/186
See application file for complete search history.

(56) References Cited

U.S. PATENT DOCUMENTS

2015/0198120 A1* 7/2015 Ueno .................. F02D 21/08
123/559.1

FOREIGN PATENT DOCUMENTS

| JP | 2015-025409 | | 2/2015 |
|---|---|---|---|
| JP | 2015-025412 | A | 2/2015 |
| JP | 2015-059549 | A | 3/2015 |
| JP | 2015-132204 | | 7/2015 |

OTHER PUBLICATIONS

Japanese Office Action dated Aug. 1, 2017, in Japanese Patent Application No. 2016-060015 (6 pages—Japanese with English translation).

* cited by examiner

*Primary Examiner* — Audrey K Bradley
(74) *Attorney, Agent, or Firm* — Smith, Gambrell & Russell, LLP

(57) ABSTRACT

An electric waste gate valve control device controls a waste gate valve provided in a waste gate passage that bypasses a portion between an upstream and a downstream of a turbine driven by exhaust of an engine and opening/closing the waste gate passage by an electric actuator. The electric waste gate valve control device includes: a position sensor that detects a position of the waste gate valve; an actuator controller that controls the electric actuator such that an opening degree of the waste gate valve becomes a target opening degree; and a fully closed position learning unit that performs fully closed position learning to acquire the position of the waste gate valve at a time when the electric actuator is driven to bring the waste gate valve into a fully closed state.

9 Claims, 4 Drawing Sheets

ELECTRIC WASTE GATE VALVE CONTROL DEVICE

CROSS-REFERENCE TO RELATED APPLICATIONS

The present application claims priority from Japanese Patent Application No. 2016-060015 filed on Mar. 24, 2016, the entire contents of which are hereby incorporated by reference.

BACKGROUND

1. Technical Field

The present invention relates to a control device that controls an electric waste gate of a turbocharger provided in an engine and, in particular, to a control device capable of appropriately controlling an opening degree of a waste gate valve from a time immediately after a start of the engine.

2. Related Art

A turbocharger that is provided in an engine mounted on an automobile or the like has: a turbine that is driven by exhaust; and a compressor that is driven by the turbine to compress fresh air (i.e. combustion air).

In general, in order to prevent an excess boost of supercharging pressure, a turbo system is provided with: a waste gate passage that bypasses a portion between an upstream and a downstream of the turbine; and a waste gate valve (i.e. WGV) that opens/closes the waste gate passage. When the supercharging pressure is boosted, the turbo system opens the waste gate valve to reduce exhaust gas flowing to the turbine side, reduces a workload of the turbine, and thereby suppresses the supercharging pressure.

In many of the conventional cases, such a waste gate valve is a mechanical valve that is opened when the supercharging pressure reaches predetermined positive pressure. However, in recent years, use of an electric waste gate valve that is opened/closed by an electric actuator with superior conformability has been proposed.

In the case where the electric waste gate valve that is opened/closed by the electric actuator is used, an opening degree thereof can be set to any opening degree including an intermediate opening degree regardless of the supercharging pressure of the waste gate valve.

For instance, immediately after a cold start of the engine, namely, in a state where warming of the engine has not been completed, the waste gate valve is opened at a predetermined opening degree. Some of the exhaust gas bypass and is introduced into a catalyst that is provided on a downstream of the turbine, while a high temperature thereof is maintained. In this way, warming up the catalyst is enhanced, and exhaust gas processing performance can be improved.

When opening control of the electric waste gate valve is executed, the waste gate valve is directly exposed to the exhaust gas and thus reaches the high temperature. Due to thermal expansion of each member thereof, a fully closed position of the waste gate valve is changed.

For this reason, unless the fully closed position that serves as a reference point of the opening control is appropriately learned, the opening degree cannot accurately be controlled.

As related art on fully closed position learning and the like of the electric waste gate valve, for instance, a learning unit that performs first learning and second learning and computing a difference between a learning value acquired in the first learning and a learning value acquired in the second learning is described in Japanese Unexamined Patent Application Publication (JP-A) No. 2015-025409 (Patent Document 1). In the first learning, the waste gate valve is fully closed before the start of the engine. Then, an initial fully closed position of the waste gate valve is learned from a position detected by a detector. In the second learning, the waste gate valve is fully closed after the start of the engine. Then, a zero point of the waste gate valve is learned from a position detected by the detector.

In addition, a reference position learning device is described in JP-A No. 2015-132204 (Patent Document 2). In the reference position learning device, a reference position of a valve that adjusts a flow of exhaust or intake air of an internal combustion engine is learned by a first reference position learning unit at a start of the internal combustion engine, and is learned by a second reference position learning unit when a predetermined learning condition is established after the start of the internal combustion engine. The reference position is updated on the basis of these learning reference positions, and the valve is controlled by using the updated reference position.

In the above-described related art, it is required to drive the waste gate valve once to a fully closed state during the start of the engine, so as to perform the fully closed position learning. Thus, while the fully closed position learning is performed, the exhaust bypass (i.e. catalyst warm-up enhancing operation) by opening the waste gate valve cannot be performed.

In particular, in a vehicle with a push-type starter switch that has widely been used in recent years, the engine is immediately started after ignition-on. Thus, enough time to perform the fully closed position learning is not provided before the start, which is disadvantageous from a perspective view of enhancing the catalyst warming-up.

In order to improve the exhaust gas processing performance immediately after the start, the opening control of the waste gate valve can desirably be executed immediately after the start of the engine.

SUMMARY OF THE INVENTION

It is desirable to provide an electric waste gate valve control device capable of appropriately controlling an opening degree of a waste gate valve from a time immediately after a start of an engine.

The present invention solves the above-described problem as will be described below.

A first aspect of the present invention provides an electric waste gate valve control device that controls a waste gate valve, the waste gate valve being provided in a waste gate passage that bypasses a portion between an upstream and a downstream of a turbine driven by exhaust of an engine and opening/closing the waste gate passage by an electric actuator. The electric waste gate valve control device includes: a position sensor that detects a position of the waste gate valve; an actuator controller that controls the electric actuator such that an opening degree of the waste gate valve becomes a target opening degree; and a fully closed position learning unit that performs fully closed position learning to acquire the position of the waste gate valve at a time when the electric actuator is driven to bring the waste gate valve into a fully closed state. The fully closed position learning unit acquires a first fully closed position by performing the fully closed position learning during a stop of the engine, and acquires a second fully closed position by performing the fully closed position learning during an operation of the engine. The actuator controller controls the electric actuator on a basis of the first fully closed position in the case where a difference between the first fully closed position, which is acquired before a start of the engine, and the second fully closed position is equal to or smaller than a predetermined threshold value when the engine is started, and controls the electric actuator on a basis of the second fully closed position in a case where the a difference between the first fully closed position and the second fully closed position is not equal to or smaller than the predetermined threshold value.

The fully closed position learning unit may perform the fully closed position learning to acquire the first fully closed position at a time when the engine is stopped and leakage of an evaporated fuel gas processing device is checked.

The electric waste gate valve control device may further include a temperature correcting unit that performs predetermined temperature correction on the second fully closed position to estimate a current fully closed position in the case where the electric actuator is controlled on the basis of the second fully closed position.

The fully closed position learning unit may perform the fully closed position learning to acquire a third fully closed position in a period after an ignition-on operation and before the start of the engine. The actuator controller may control the electric actuator not a basis of the first fully closed position and the second fully closed position but a basis of the third fully closed position in the case where the third fully closed position is acquired in the period before the start of the engine.

A second aspect of the present invention provides an electric waste gate valve control device configured to control a waste gate valve, the waste gate valve being provided in a waste gate passage that bypasses a portion between an upstream and a downstream of a turbine driven by exhaust of an engine and opening/closing the waste gate passage by an electric actuator. The electric waste gate valve control device circuitry configured to detect a position of the waste gate valve, control the electric actuator such that an opening degree of the waste gate valve becomes a target opening degree, and perform fully closed position learning to acquire the position of the waste gate valve at a time when the electric actuator is driven to bring the waste gate valve into a fully closed state. The circuitry is configured to acquire a first fully closed position by performing the fully closed position learning during a stop of the engine, and acquire a second fully closed position by performing the fully closed position learning during an operation of the engine. The circuitry is configured to control the electric actuator on a basis of the first fully closed position in the case where a difference between the first fully closed position, which is acquired before a start of the engine, and the second fully closed position is equal to or smaller than a predetermined threshold value when the engine is started, and control the electric actuator on a basis of the second fully closed position in a case where the a difference between the first fully closed position and the second fully closed position is not equal to or smaller than the predetermined threshold value.

DETAILED DESCRIPTION

The present invention provides an electric waste gate valve control device capable of appropriately controlling an opening degree of a waste gate valve from a time immediately after a start of an engine by executing opening control of the waste gate valve on the basis of a learning value during soaking in the case where a difference between a learning value in a last driving cycle and the learning value during soaking is equal to or smaller than a predetermined value and by performing temperature correction on the learning value in the last driving cycle for use in the case where the difference exceeds the predetermined value.

EXAMPLE

A description will hereinafter be made on an example of an electric waste gate valve control device, to which the present invention is applied.

The electric waste gate valve control device of the example is mounted on an automobile, such as a passenger car, on which a turbocharged engine of a gasoline direct injection type with horizontally opposed four cylinders is mounted as a traveling power source, for instance.

Figure 1:
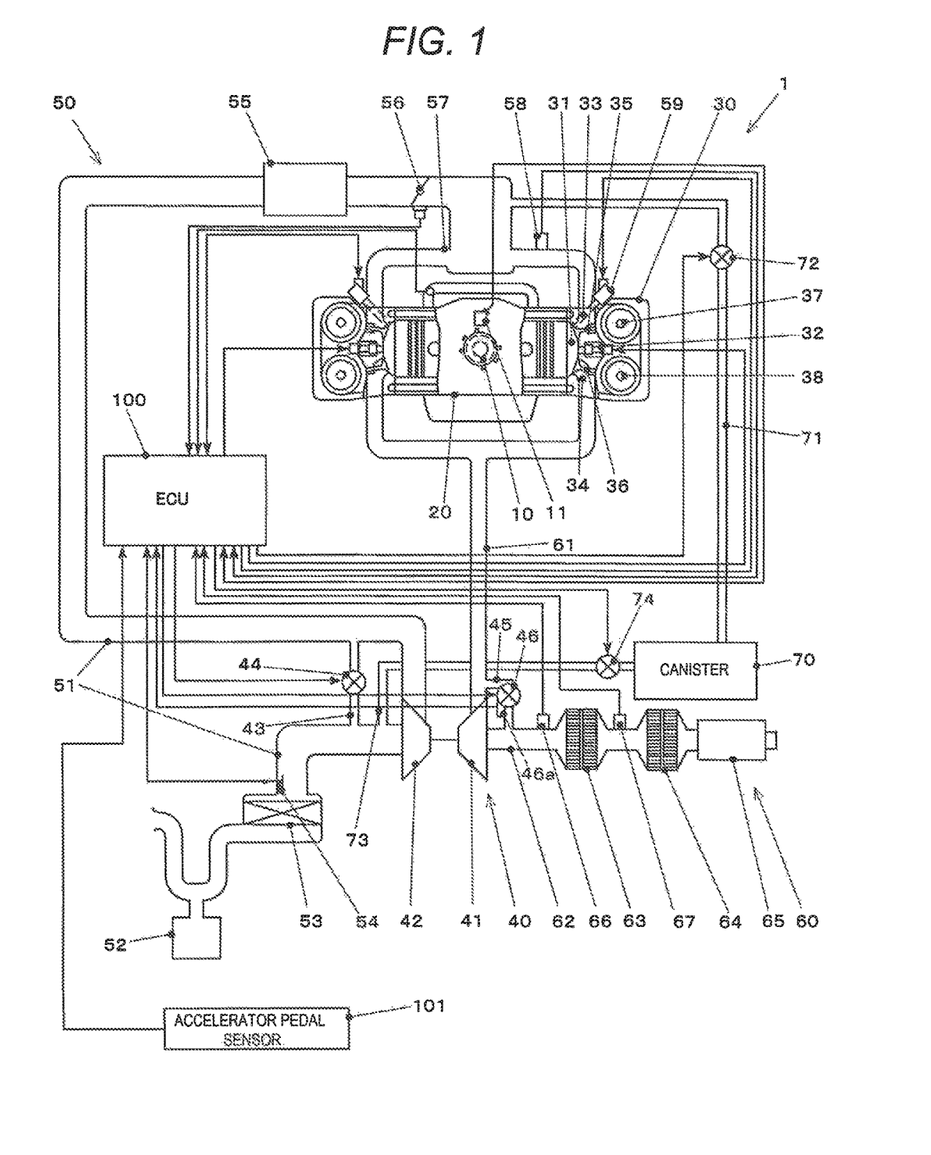
FIG. 1 schematically illustrates a configuration of an engine that has a first example of an electric waste gate valve control device, to which the present invention is applied.

FIG. 1 schematically illustrates a configuration of an engine that has an electric waste gate valve control device of a first example.

An engine 1 has a crankshaft 10, a cylinder block 20, a cylinder head 30, a turbocharger 40, an intake system 50, an exhaust system 60, a canister 70, an engine control unit (ECU) 100, and the like.

The crankshaft 10 is a rotary shaft that serves as an output shaft of the engine 1.

A power transmission mechanism, such as an unillustrated transmission, is coupled to one end of the crankshaft 10.

A piston is coupled to the crankshaft 10 via an unillustrated connecting rod.

A crank angle sensor 11 that detects an angle position of the crankshaft 10 is provided at the end of the crankshaft 10.

Output of the crank angle sensor 11 is transmitted to the ECU 100.

The cylinder block 20 is divided into two in a manner to hold the crankshaft 10 therebetween in a right and left direction when being vertically mounted on a vehicle body.

A crankcase is provided in a central portion of the cylinder block 20. The crankcase accommodates the crankshaft 10 therein and has a main bearing that rotatably supports the crankshaft 10.

For instance, in a case of the four cylinders, a pair of cylinders is provided in each of right and left banks of the cylinder block 20 that are respectively disposed on right and left sides with the crankcase being interposed therebetween. The piston is inserted and reciprocates in each of the cylinders.

The cylinder head 30 is provided at each of opposite ends from the crankshaft 10 (i.e. right and left ends opposed to the crankshaft 10) of the cylinder block 20.

The cylinder head 30 includes a combustion chamber 31, an ignition plug 32, an intake port 33, an exhaust port 34, an intake valve 35, an exhaust valve 36, an intake camshaft 37, an exhaust camshaft 38, and the like.

The combustion chamber 31 is provided by recessing a portion of the cylinder head 30, which opposes a piston crown surface, in a pentroof shape, for instance.

The ignition plug 32 is provided at center of the combustion chamber 31, produces a spark in accordance with an ignition signal from the ECU 100, and ignites air-fuel mixture.

The intake port 33 is a passage through which combustion air (i.e., fresh air) is introduced into the combustion chamber 31.

The exhaust port 34 is a passage through which burnt gas (i.e. exhaust gas) is discharged from the combustion chamber 31.

The intake valve 35 and the exhaust valve 36 respectively open/close the intake port 33 and the exhaust port 34 at predetermined valve timing.

Two each of the intake valve 35 and the exhaust valve 36 are provided in each of the cylinders, for instance.

The intake valve 35 and the exhaust valve 36 are respectively opened/closed by the intake camshaft 37 and the exhaust camshaft 38, each of which synchronously rotates at half number of rotations of the crankshaft 10.

Cam sprockets of the intake camshaft 37 and the exhaust camshaft 38 are each provided with an unillustrated valve timing variable mechanism that advances/delays a phase of the camshaft to vary opening timing and closing timing of the valve.

The turbocharger 40 is a supercharger that uses energy possessed by exhaust of the engine 1 to compress and supercharge the combustion air (i.e. the fresh air).

The turbocharger 40 includes a turbine 41, a compressor 42, an air-bypass passage 43, an air-bypass valve 44, a waste gate passage 45, a waste gate valve 46, and the like.

The turbine 41 is rotationally driven by the exhaust gas of the engine 1.

The compressor 42 is coaxially attached to the turbine 41, is rotationally driven by the turbine 41, and compresses the air.

The air-pass passage 43 extracts some of the air from a downstream of the compressor 42 and recirculates some of the air to an upstream of the compressor 42.

The air-bypass valve 44 is provided in the air-bypass passage 43 and is switched between a closed state and an opened state in two steps in accordance with a command from the ECU 100. In the opened state, the air-bypass valve 44 substantially closes the air-bypass passage 43. In the opened state, the air-bypass valve 44 allows the air to flow through the air-bypass passage 43.

The air-bypass valve 44 is an electric valve having a valve body that is driven to be opened/closed by an electric actuator.

The air-bypass valve 44 is brought into the opened state so as to prevent surging, to protect a blade, and the like of the turbocharger 40 in the case where a throttle valve 56 is abruptly closed, or the like, for instance. Then, the air in an intake pipe on the downstream of the compressor 42 is recirculated to the upstream of the compressor 42, so as to reduce surplus pressure.

The waste gate passage 45 extracts some of the exhaust gas from an upstream of the turbine 41 and causes some of the exhaust gas to bypass to a downstream of the turbine 41 for purposes of supercharging pressure control, a catalyst temperature increase, and the like.

The waste gate passage 45 is integrally provided in a housing of the turbine 41.

The waste gate valve 46 has a valve body that is provided in the waste gate passage 45 and opens/closes the passage, and controls a flow rate of the exhaust gas that flows through the waste gate passage 45.

The waste gate valve 46 is an electric waste gate valve having an electric actuator that drives to open/close the valve body in accordance with a command from the ECU 100.

The waste gate valve 46 is provided with a position sensor 46a as a position encoder that detects an opening degree position thereof.

Output of the position sensor 46a is transmitted to the ECU 100.

The electric actuator is subjected to feedback control by the ECU 100 such that the position detected by the position sensor 46a approximates to a target position.

The waste gate valve 46 can be switched between a fully opened state and a fully closed state. In addition, any opening degree can be set therefor at an intermediate position therebetween.

The intake system 50 introduces the air into the intake port 33.

The intake system 50 includes an intake duct 51, a chamber 52, an air cleaner 53, an airflow meter 54, an intercooler 55, the throttle valve 56, an intake manifold 57, an intake pressure sensor 58, an injector 59, and the like.

The intake duct 51 is a passage that introduces ambient air into the intake port 33.

The chamber 52 is a space provided near an inlet portion of the intake duct 51 in a manner to communicate therewith.

The air cleaner 53 is provided on a downstream of a communicating portion of the intake duct 51 with the chamber 52, and filters the air to remove dust and the like.

The airflow meter 54 is provided near an outlet of the air cleaner 53 and measures a flow rate of the air that flows through the intake duct 51.

Output of the airflow meter 54 is transmitted to the ECU 100.

The compressor 42 of the turbocharger 40 is provided on a downstream of the airflow meter 54.

The intercooler 55 is a heat exchanger that is provided on a downstream of the compressor 42 in the intake duct 51 and cools the air, which has been compressed and has reached a high temperature, through heat exchange with travel wind or the like, for instance.

The throttle valve 56 is a butterfly valve that is provided on a downstream of the intercooler 55 in the intake duct 51 and adjusts the flow rate of the air, so as to control output of the engine 1.

The throttle valve 56 is driven to be opened/closed by an unillustrated throttle actuator in accordance with an operation of an unillustrated accelerator pedal by a driver, or the like.

In addition, the throttle valve 56 is provided with a throttle sensor that detects an opening degree thereof, and output of the throttle sensor is transmitted to the ECU 100.

The intake manifold 57 is a branched pipe that is provided on a downstream of the throttle valve 56 and distributes the air to the intake port 33 of each of the cylinders.

The intake pressure sensor 58 detects pressure of the air (i.e. intake pressure) in the intake manifold 57.

Output of the intake pressure sensor 58 is transmitted to the ECU 100.

The injector 59 is provided at an end of the intake manifold 57 on the cylinder head 30 side and injects fuel into the combustion chamber 31 to produce the air-fuel mixture in accordance with a valve opening signal generated by the ECU 100.

The exhaust system 60 discharges the exhaust gas that is discharged from the exhaust port 34.

The exhaust system 60 has an exhaust manifold 61, an exhaust pipe 62, a front catalyst 63, a rear catalyst 64, a silencer 65, an air-fuel ratio sensor 66, a rear $O_2$ sensor 67, and the like.

The exhaust manifold 61 is a collecting pipe that collects the exhaust gas discharged from the exhaust port 34 of each of the cylinders.

The turbine 41 of the turbocharger 40 is disposed on a downstream of the exhaust manifold 61.

The exhaust pipe 62 is a pipe line that is used to discharge the exhaust gas from the turbine 41 to outside.

The front catalyst 63 and the rear catalyst 64 are provided in an intermediate part of the exhaust pipe 62 and each includes a three-way catalyst that purifies HC, NOx, CO, and the like in the exhaust gas.

The front catalyst 63 is provided adjacent to an outlet of the turbine 41. The rear catalyst 64 is provided on an exit side of the front catalyst 63.

The silencer 65 is provided near an outlet of the exhaust pipe 62 and reduces sound energy of the exhaust gas.

The air-fuel ratio sensor 66 is provided between the outlet of the turbine 41 and an inlet of the front catalyst 63.

The rear $O_2$ sensor 67 is provided between the outlet of the front catalyst 63 and an inlet of the rear catalyst 64.

The air-fuel ratio sensor 66 and the rear $O_2$ sensor 67 each generate an output voltage that corresponds to oxygen concentration of the exhaust gas, and thereby detect an oxygen amount in the exhaust gas.

Compared to the rear $O_2$ sensor 67, the air-fuel ratio sensor 66 is a linear output sensor that can detect the oxygen concentration at the air-fuel ratio in a wide range.

Output of the air-fuel ratio sensor 66 and output of the rear $O_2$ sensor 67 are transmitted to the ECU 100.

Evaporated fuel gas (i.e. fuel vapor) that is generated in an unillustrated fuel tank, in which gasoline used as the fuel of the engine 1 is stored, is introduced into the canister (i.e. the charcoal canister) 70 and is temporarily occluded therein.

In the canister 70, activated charcoal that can temporarily adsorb the evaporated fuel gas is accommodated in a canister case as a casing made of a resin.

The canister 70 includes: a purge line 71 and a purge control valve 72 that are primarily used during non-supercharging; a purge line 73 and a purge control valve 74 that are primarily used during supercharging; and the like.

The purge line 71 is a passage, ends of which are respectively coupled to the canister 70 and the intake manifold 57, and which communicates between inner sides thereof.

The purge line 71 introduces purge gas that contains the evaporated fuel gas discharged from the canister 70 into the intake manifold 57 during non-supercharging, during which the intake manifold 57 has negative pressure.

The purge control valve (i.e. PCV) 72 is a duty control solenoid valve that is provided in an intermediate portion of the purge line 71.

The PCV 72 can switch between an opened state and a closed state and can also set an opening degree thereof in the opened state in accordance with a command from the ECU 100.

The purge line 73 is a passage, ends of which are respectively coupled to the canister 70 and a region in the intake duct 51 that is adjacent to an inlet portion of the compressor 42, and which communicates between inner sides thereof.

The purge line 73 introduces the purge gas into the intake duct 51 on the upstream of the compressor 42 during supercharging, during which the intake manifold 57 has positive pressure and the introduction of the purge gas by the purge line 71 is difficult.

The purge control valve (i.e. PCV) 74 is an electromagnetic valve that is provided in an intermediate portion of the purge line 73.

The PCV 74 can switch between an opened state and a closed state in accordance with a command from the ECU 100.

The engine control unit (i.e. ECU) 100 comprehensively controls the engine 1 and auxiliaries thereof.

The ECU 100 includes an information processing unit such as a CPU, storage units such as a RAM and a ROM, an input/output interface, a bus that couples these components, and the like.

The ECU 100 is provided with an accelerator pedal sensor 101 that detects the depression amount of an unillustrated accelerator pedal by the driver.

The ECU 100 has a function of setting driver requested torque on the basis of output of the accelerator pedal sensor 101 and the like.

The ECU 100 controls a throttle valve opening degree, supercharging pressure, a fuel injection amount, ignition timing, valve timing, and the like such that actually generated torque by the engine 1 approximates to the set driver requested torque.

In one example of the present invention, the ECU 100 may serve as an "electric waste gate valve control device" that controls the electric actuator of the waste gate valve 46, and further has a function of learning and correcting a fully closed position that serves as a reference (i.e. a zero point) of opening control.

In one example of the present invention, the ECU 100 also may serve as an "actuator controller", a "fully closed position learning unit", and a "temperature correcting unit".

A detailed description will hereinafter be made on the ECU 100.

The electric waste gate valve control device of the example acquires or learns the fully closed position of the waste gate valve 46 when warming is completed in the last driving cycle and when a temperature around the waste gate valve 46 is substantially cooled to a normal temperature (i.e. ambient temperature) during soaking after termination of the last driving cycle.

Figure 2:
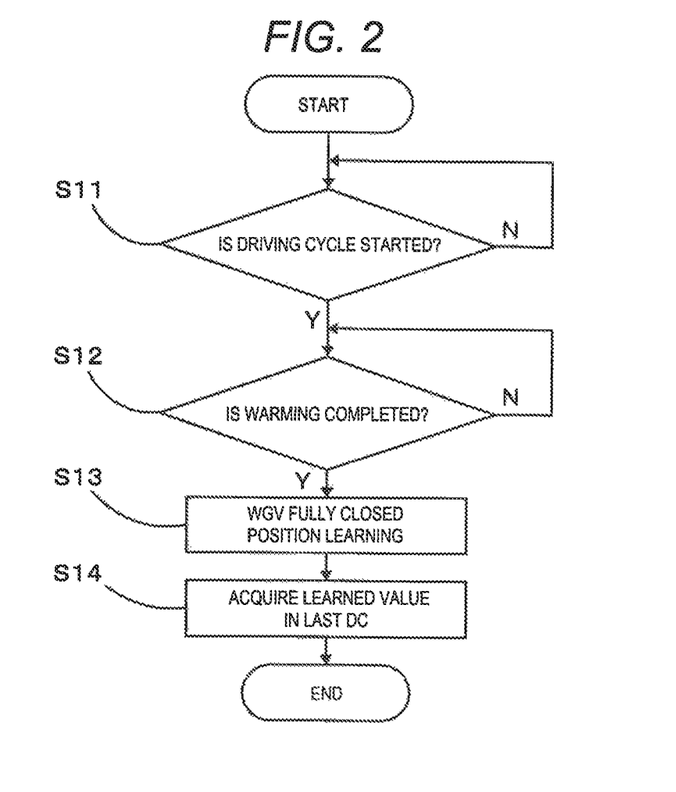
FIG. 2 a flowchart that illustrates an operation of the electric waste gate valve control device in FIG. 1 when fully closed position learning is performed in a driving cycle.

FIG. 2 is a flowchart that illustrates an operation of the electric waste gate valve control device in FIG. 1 when fully closed position learning is performed in the driving cycle.

A description will hereinafter be made on steps of the process in sequence.

<Step S11: Determination on Start of Driving Cycle>

The ECU 100 determines whether the engine 1 is started and the driving cycle, being defined as a period from a start of the engine 1 to a completion of vehicle driving by stopping the engine 1, is started.

If the driving cycle is started, the process proceeds to step S12. If not, step S11 is repeated.

<Step S12: Determination on Completion of Warming>

The ECU 100 determines warmed states of the engine 1 and the turbocharger 40 on the basis of a coolant temperature, a lubricant temperature, an external temperature, an accumulated intake air amount after the start, and the like of the engine 1, for instance.

If a predetermined warming completion condition is satisfied, the ECU 100 determines that the warming is completed, and the process proceeds to step S13. If not, step S12 is repeated.

<Step S13: Waste Gate Valve Fully Closed Position Learning>

The ECU 100 drives the waste gate valve 46 using the electric actuator to a drivable limit in a closing direction and brings the waste gate valve 46 into the fully closed state.

Then, the process proceeds to step S14.

<Step S14: Learned Value in Last Driving Cycle Acquisition>

The ECU 100 acquires an output value of the position sensor 46a of the waste gate valve 46 in the fully closed state as a "learning value in the last driving cycle" and retains or stores the value.

Then, a series of the process is terminated.

Figure 3:
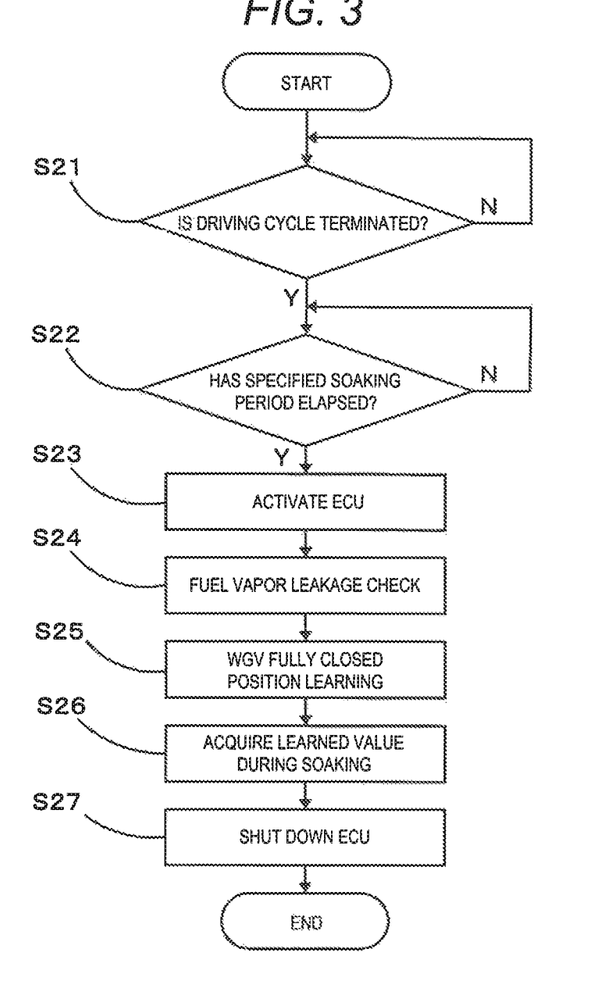
FIG. 3 is a flowchart that illustrates an operation of the electric waste gate valve control device in FIG. 1 when the fully closed position learning is performed during soaking.

FIG. 3 is a flowchart that illustrates an operation of the electric waste gate valve control device in FIG. 1 when the fully closed position learning is performed during soaking.

A description will hereinafter be made on steps of the process in sequence.

<Step S21: Determination on Termination of Driving Cycle>

The ECU 100 determines whether the operation of the engine 1 is terminated, and the driving cycle is terminated. It is noted, however, a temporal stop, such as an idle stop control in which the engine 1 is restarted within a few seconds to a few minutes, is an exceptional of the termination of the driving cycle.

If the driving cycle is terminated, the ECU 100 is brought into a sleep state where the functions thereof are suspended except for some functions, such as a timer function capable of executing the process in step S22. Then, the process proceeds to step S22. If not, step S21 is repeated.

<Step S22: Determination on Lapse of Predetermined Soaking Period>

In the sleep state, the ECU 100 determines whether a soaking period elapses a predetermined period, for instance approximately five hours, after the termination of the operation of the engine 1.

This predetermined period is determined, for instance, based on a time period required for reducing temperatures of the engine 1 and the auxiliary parts, including the waste gate valve 46, substantially to the normal temperature (i.e. ambient temperature).

If the predetermined soaking period has elapsed, the process proceeds to step S23. If not, step S22 is repeated.

<Step S23: Activate ECU>

The ECU 100 returns from the sleep state and is activated.

Then, the process proceeds to step S24.

<Step S24: Execute Fuel Vapor Leakage Check>

The ECU 100 executes a known fuel vapor leakage check process, so as to determine presence or absence of leakage of the evaporated fuel gas (i.e. the fuel vapor) from the canister 70, the purge lines 71, 73, the PCVs 72, 74, or the like.

In the fuel vapor leakage check, for instance, the negative pressure is generated in the fuel tank by the pump during the stop of the engine, and a pressure change in the fuel tank is detected. In this way, the leakage of the evaporated fuel gas from the fuel tank or the purge line is detected.

Then, the process proceeds to step S25.

<Step S25: Waste Gate Valve Fully Closed Position Learning>

The ECU 100 drives the waste gate valve 46 using the electric actuator to a drivable limit in a closing direction and brings the waste gate valve 46 into the fully closed state.

Then, the process proceeds to step S26.

<Step S26: Learning Value During Soaking Acquisition>

The ECU 100 acquires the output value of the position sensor 46a of the waste gate valve 46 in the fully closed state as a "learning value during soaking" and retains or stores the value.

Then, the process proceeds to step S27.

<Step S27: Shut Down ECU>

The ECU 100 is shut down, and a series of the process is terminated.

Figure 4:
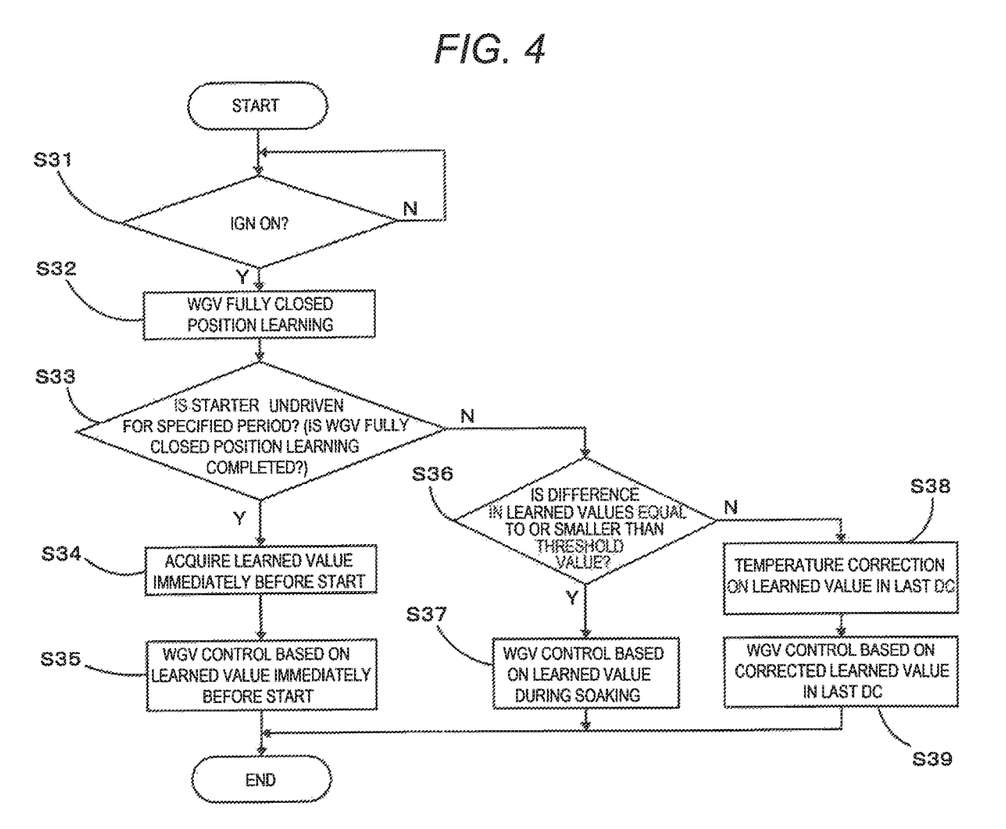
FIG. 4 is a flowchart that illustrates an operation of the electric waste gate valve control device in FIG. 1 at a start of the engine.

FIG. 4 is a flowchart that illustrates an operation of the electric waste gate valve control device in FIG. 1 at the start of the engine.

A description will hereinafter be made on steps of the process in sequence.

<Step 331: Ignition-on Determination>

The ECU 100 determines whether an ignition-on operation as a power-on operation of a primary power supply of the vehicle is performed by a user (i.e. the driver).

If the ignition-on operation is performed, the ECU 100 is activated. Then, the process proceeds to step S32. If not, step S31 is repeated.

<Step S32: Waste Gate Valve Fully Closed Position Learning>

The ECU 100 drives the waste gate valve 46 using the electric actuator to a drivable limit in a closing direction and brings the waste gate valve 46 into the fully closed state.

Then, the process proceeds to step S33.

<Step S33: Determination on Presence or Absence of Driving of Starter in Predetermined Period>

The ECU 100 determines whether a starter is not driven, or a starter motor is not energized for a predetermined period, for instance approximately a few seconds, after the ignition-on operation.

This determination corresponds to a determination on whether the starter is not driven for a time required to complete the waste gate valve fully closed position learning started in step S32, that is, whether the engine 1 is not started.

If the starter is undriven for the predetermined period or longer, the process proceeds to step S34. If not, the process proceeds to step S36.

<Step S34: Learning Value Immediately Before Start Acquisition>

The ECU 100 acquires the output value of the position sensor 46a of the waste gate valve 46 in the fully closed state as a "learning value immediately before the start" and retains or stores the value.

Then, the process proceeds to step S35.

As described above, in step S32 to step S34, the ECU 100 performs the fully closed position learning of the waste gate valve 46 to acquire the "learning value immediately before the start" in a period from the ignition-on by the user to the start of the engine 1. If the fully closed position learning is completed before the start of the engine 1, the ECU 100 acquires the "learning value immediately before the start".

<Step S35 Execute Waste Gate Valve Control Based on Learning Value Immediately Before Start>

The ECU 100 sets the position of the waste gate valve 46 that corresponds to the learning value immediately before the start as the fully closed position that serves as a reference for setting of a target opening degree. Then, the ECU 100 starts the opening control of the waste gate valve 46.

The target opening degree on the waste gate valve 46 is read out from a target opening degree map, which is prepared in advance, by using various parameters indicative of an operation state of the engine 1, for instance.

Immediately after the start of the engine 1, the target opening degree of the waste gate valve 46 is set to keep a predetermined opening degree or larger in consideration of the catalyst temperature increase. Meanwhile, in the case where the opening degree is set too large, an amount of the exhaust gas that is introduced into the turbine 41 is reduced, which results increased time response delays of the supercharging pressure and the torque during acceleration or the like. Thus, it is important to accurately control the opening degree of the waste gate valve 46 in consideration of a balance between drivability and warming of the catalyst.

The ECU 100 computes target position sensor output that corresponds to the target opening degree on the basis of a fully closed position learning value which is the value learned immediately before the start in this case and represents the output of the position sensor 46a in the fully closed state. The ECU 100 also executes the feedback control of the electric actuator such that the actual output of the position sensor 46a approximates to the target position sensor output.

Then, a series of the process is terminated.

<Step S36: Determination on Difference Between Learning Values>

The ECU 100 computes a difference between the learning value during soaking and the learning value in the last driving cycle. If this difference is equal to or smaller than a predetermined threshold value (i.e. within a predetermined range), the process proceeds to step S37. If not, the process proceeds to step S38.

<Step S37: Execute Waste Gate Valve Control Based on Learning Value During Soaking>

The ECU 100 sets the position of the waste gate valve 46 that corresponds to the learning value during soaking as the fully closed position that serves as the reference for setting of the target opening degree. Then, the ECU 100 starts the opening control of the waste gate valve 46.

Then, a series of the process is terminated.

<Step S36: Temperature Correction on Learning Value in Last Driving Cycle>

The ECU 100 computes a correction value that is acquired by performing temperature correction on the learning value in the last driving cycle on the basis of a difference between a temperature of the waste gate valve 46 during said learning and a current temperature thereof.

In this way, the fully closed position can appropriately be set without an influence of thermal deformation of the waste gate valve 46 and peripheral parts thereof.

A correction amount of the fully closed position that corresponds to a temperature change can be computed in advance by an experiment or a simulation, for instance.

Then, the process proceeds to step S39.

<Step S39: Execute Waste Gate Valve Control Based on Corrected Learning Value in the Last Driving Cycle>

The ECU 100 sets the position of the waste gate valve 46 that corresponds to the learning value in the last driving cycle corrected in step S38 as the fully closed position that serves as the reference for setting of the target opening degree. Then, the ECU 100 starts the opening control of the waste gate valve 46.

Then, a series of the process is terminated.

According to the example that has been described so far, following effects can be acquired.

(1) In the case where a deviation between the learning value during soaking and the learning value in the last driving cycle is small and it is thus considered that reliability of the learning value during soaking is high, the opening degree of the waste gate valve 46 is controlled with the learning value during soaking as the reference. In this way, the waste gate valve 46 can accurately be controlled from a time immediately after the start of the engine 1, which can enhance warming-up of the catalyst, and the like.

On the other hand, in the case where the deviation between the learning value during soaking and the learning value in the last driving cycle is large and the reliability of the learning value during soaking is thus questioned (i.e. the learning value during soaking is assumed as an abnormal value), the opening degree of the waste gate valve 46 is controlled with the learning value in the last driving cycle as the reference. In this way, the reliability can be secured, and warming the catalyst can promptly be started.

(2) The fully closed position learning in a cold state is performed at the same time as the fuel vapor leakage check or by following the fuel vapor leakage check. In this way, the processes that are executed by activating the ECU 100 during soaking of the vehicle are collectively executed at the same timing. Thus, an activation frequency of the ECU 100 is reduced, which can prevent complication of the control and increased electric power consumption.

(3) In the case where the learning value during soaking is not used, the learning value in the last driving cycle is subjected to the temperature correction for use, and thus the waste gate valve 46 can accurately be controlled even in the case that the control based on the learning value during soaking cannot be executed.

(4) In the case where the engine 1 is not immediately started after the ignition-on, the fully closed position learning is performed by using a time until the start. Then, the waste gate valve is controlled on the basis of the learning value immediately before the start that is acquired herein. In this way, the waste gate valve can further accurately be controlled by using the latest learning value.

MODIFIED EXAMPLES

The present invention is not limited to the example that has been described so far, and various modifications and changes can be made thereto. These modifications and changes also fall within the technical scope of the present invention.

For instance, the configurations of the engine and the electric waste gate valve control device are not limited to the configurations thereof in the above-described example but can appropriately be changed.

For instance, a cylinder layout, the number of the cylinders, the number of the turbochargers for the engine, and the like are not limited to those described in the above-described example but can appropriately be changed.

The engine in the example is the direct injection gasoline engine as one example. However, the present invention can also be applied to a port injection gasoline engine, a diesel engine, and a turbocharged engine that uses another type of the fuel.

In the example, the fully closed position learning during soaking is performed during the fuel vapor leakage check. However, the fully closed position learning may be performed at different timing therefrom.

The invention claimed is:

1. An electric waste gate valve control device that controls a waste gate valve, the waste gate valve being provided in a waste gate passage that bypasses a portion between an upstream and a downstream of a turbine driven by exhaust of an engine and opening/closing the waste gate passage by an electric actuator, the electric waste gate valve control device comprising:
- a position sensor that detects a position of the waste gate valve;
- an actuator controller that controls the electric actuator such that an opening degree of the waste gate valve becomes a target opening degree; and
- a fully closed position learning unit that performs fully closed position learning and acquires the position of the waste gate valve at a time when the electric actuator is driven to bring the waste gate valve into a fully closed state, wherein
- the fully closed position learning unit acquires a first fully closed position by performing the fully closed position learning during a stop of the engine, and acquires a second fully closed position by performing the fully closed position learning during an operation of the engine, and
- the actuator controller controls the electric actuator on a basis of the first fully closed position in a case where a difference between the first fully closed position, which is acquired before a start of the engine, and the second fully closed position is equal to or smaller than a predetermined threshold value when the engine is started, and controls the electric actuator on a basis of the second fully closed position in a case where the a difference between the first fully closed position and the second fully closed position is not equal to or smaller than the predetermined threshold value.

2. The electric waste gate valve control device according to claim 1, wherein the fully closed position learning unit performs the fully closed position learning and acquires the first fully closed position at a time when the engine is stopped and leakage of an evaporated fuel gas processing device is checked.

3. The electric waste gate valve control device according to claim 1 further comprising:
- a temperature correcting unit that performs predetermined temperature correction on the second fully closed position and estimates a current fully closed position in a case where the electric actuator is controlled on the basis of the second fully closed position.

4. The electric waste gate valve control device according to claim 2 further comprising:
- a temperature correcting unit that performs predetermined temperature correction on the second fully closed position and estimates a current fully closed position in a case where the electric actuator is controlled on the basis of the second fully closed position.

5. The electric waste gate valve control device according to claim 1, wherein
- the fully closed position learning unit performs the fully closed position learning for acquiring a third fully closed position in a period after an ignition-on operation and before the start of the engine, and
- in a case where the third fully closed position is acquired in the period before the start of the engine, the actuator controller controls the electric actuator on a basis of the third fully closed position regardless of the first fully closed position or the second fully closed position.

6. The electric waste gate valve control device according to claim 2, wherein
- the fully closed position learning unit performs the fully closed position learning for acquiring a third fully closed position in a period after an ignition-on operation and before the start of the engine, and
- in a case where the third fully closed position is acquired in the period before the start of the engine, the actuator controller controls the electric actuator on a basis of the third fully closed position regardless of the first fully closed position or the second fully closed position.

7. The electric waste gate valve control device according to claim 3, wherein
- the fully closed position learning unit performs the fully closed position learning for acquiring a third fully closed position in a period after an ignition-on operation and before the start of the engine, and
- in a case where the third fully closed position is acquired in the period before the start of the engine, the actuator controller controls the electric actuator on a basis of the third fully closed position regardless of the first fully closed position or the second fully closed position.

8. The electric waste gate valve control device according to claim 4, wherein
- the fully closed position learning unit performs the fully closed position learning for acquiring a third fully closed position in a period after an ignition-on operation and before the start of the engine, and
- in a case where the third fully closed position is acquired in the period before the start of the engine, the actuator controller controls the electric actuator on a basis of the third fully closed position regardless of the first fully closed position or the second fully closed position.

9. An electric waste gate valve control device configured to control a waste gate valve, the waste gate valve being provided in a waste gate passage that bypasses a portion between an upstream and a downstream of a turbine driven by exhaust of an engine and opening/closing the waste gate passage by an electric actuator, the electric waste gate valve control device comprising:
- circuitry configured to
  - detect a position of the waste gate valve;
  - control the electric actuator such that an opening degree of the waste gate valve becomes a target opening degree; and
  - perform fully closed position learning and acquires the position of the waste gate valve at a time when the electric actuator is driven to bring the waste gate valve into a fully closed state,
- the circuitry being configured to acquire a first fully closed position by performing the fully closed position learning during a stop of the engine, and acquires a second fully closed position by performing the fully closed position learning during an operation of the engine, and control the electric actuator on a basis of the first fully closed position in a first case where a difference between the first fully closed position, which is acquired before a start of the engine, and the second fully closed position is equal to or smaller than a predetermined threshold value when the engine is started, and control the electric actuator on a basis of the second fully closed position in a case where the a difference between the first fully closed position and the second fully closed position is not equal to or smaller than the predetermined threshold value.

* * * * *